United States Patent
Karlsson

(10) Patent No.: US 10,618,980 B2
(45) Date of Patent: Apr. 14, 2020

(54) CELLULOSE ETHERS WITH TEMPORARY CROSS-LINKS, A PROCESS TO MAKE THEM, AND THEIR USE

(71) Applicants: Akzo Nobel Chemicals International B.V., Arnhem (NL); NOURYON CHEMICALS INTERNATIONAL B.V., Arnhem (NL)

(72) Inventor: Hans Jonas Karlsson, Gothenburg (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/768,338

(22) PCT Filed: Oct. 13, 2016

(86) PCT No.: PCT/EP2016/074541
§ 371 (c)(1),
(2) Date: Apr. 13, 2018

(87) PCT Pub. No.: WO2017/064164
PCT Pub. Date: Apr. 20, 2017

(65) Prior Publication Data
US 2018/0319899 A1    Nov. 8, 2018

(30) Foreign Application Priority Data
Oct. 16, 2015    (EP) .................................... 15190280

(51) Int. Cl.
| C08B 15/00 | (2006.01) |
| C08L 1/26 | (2006.01) |
| C08J 3/05 | (2006.01) |
| C09J 101/26 | (2006.01) |
| C09D 101/26 | (2006.01) |
| C08J 3/24 | (2006.01) |
| C08B 11/20 | (2006.01) |

(52) U.S. Cl.
CPC ............. *C08B 15/005* (2013.01); *C08B 11/20* (2013.01); *C08J 3/05* (2013.01); *C08J 3/24* (2013.01); *C08L 1/26* (2013.01); *C09D 101/26* (2013.01); *C09J 101/26* (2013.01); *C08J 2301/26* (2013.01); *C08L 2312/00* (2013.01)

(58) Field of Classification Search
CPC ........ C08B 15/00; C08B 15/005; C08B 15/10
USPC ......................................................... 536/85
See application file for complete search history.

(56) References Cited

U.S. PATENT DOCUMENTS

| 2,879,268 A | 3/1959 | Jullander |
| 2003/0130500 A1 | 7/2003 | Schlesiger et al. |
| 2005/0261490 A1 | 11/2005 | Perplies et al. |
| 2010/0209723 A1 | 8/2010 | Tanaka et al. |

FOREIGN PATENT DOCUMENTS

| EP | 1 316 563 A1 | 6/2003 |
| WO | 96/18676 A1 | 6/1996 |
| WO | 03/097700 A1 | 11/2003 |
| WO | 2011/151670 A1 | 12/2011 |
| WO | 2012/122153 A1 | 9/2012 |
| WO | 2012/140328 A1 | 10/2012 |

OTHER PUBLICATIONS

International Search Report and Written Opinion for PCT/EP2016/074541, dated Dec. 22, 2016.
European Search Report for 15190280.6-1302 dated Mar. 29, 2016.
Lawal et al., "Microporous hydrogels of cellulose ether cross-linked with di- or polyfunctional glycidyl ether made for the delivery of bioactive substances", Colloid and Polymer Science; vol. 289, No. 11, Jun. 5, 2011; pp. 1261-1272.

*Primary Examiner* — Shaojia A Jiang
*Assistant Examiner* — Everett White
(74) *Attorney, Agent, or Firm* — Lorenz & Kopf, LLP

(57) ABSTRACT

The invention relates to temporary cross-linked cellulose ethers, a process to make them, as well as their use to influence the rheological profile of an aqueous medium in which they are dissolved. The temporary cross-linked cellulose ethers are characterized in that they are cellulose ethers that are Cross-linked with at least one or more compounds of the formula ($C_{1-4}$ alkyl)-OC(O)CHOHO—($C_{1-4}$ alkyl).

15 Claims, No Drawings

CELLULOSE ETHERS WITH TEMPORARY CROSS-LINKS, A PROCESS TO MAKE THEM, AND THEIR USE

This application is a national stage filing under 35 U.S.C. § 371 of PCT/EP2016/074541, filed Oct. 13, 2016, which claims priority to European Patent Application No. 15190280.6, filed Oct. 16, 2015, the contents of each of which are each incorporated herein by reference in their entirety.

The present invention relates to cellulose ethers with temporary cross-links, a process to make them, and their use in various applications.

Temporary cross-linked cellulose ethers (tCEs) are well known for their delayed dissolution in an aqueous medium, allowing to make lump-free solutions of the cellulose ether. The lump-free solution is desired in various applications, including personal care, household care, building and construction materials, oilfield, pharmaceutical, and food, notably for glues and paints. Most, if not all, conventional tCEs are obtained by reacting cellulose ether with glyoxal, as is known from WO 1996/018676. A common theory is that reacting the free hydroxyl groups of the cellulose ether with aldehydes forms hemiacetals, being reversible crosslinks. On dispersing the cross-linked cellulose ether in neutral or weakly acidic aqueous medium, the cross-links are reversed with a time delay. The result is that some time after the mixing of water and the tCE, i.e. when the cross-links are undone, an abrupt viscosity increase without lump formation is observed. The time for reversal can, inter alia, be controlled via the type of cellulose ether used, the pH of the water in which the tCE is dissolved, the temperature during dissolution, and by the degree of crosslinking of the tCE.

However, the use of glyoxal is undesired because of its unfavorable toxicological properties. Consequently there have been many efforts to (partially) replace glyoxal and to develop alternative tCEs. For example, US 2003/0130500 proposes the use of conventional aldehydes in combination with specific salts, WO 2012/122153 proposes the use of conventional aldehydes in combination with solid weak acids. WO 2003/097700 proposes to first oxidize OH groups of a cellulose ether, which oxidized groups can then subsequently be reacted with free OH groups to form reversible cross-links. Further, US 2005/0261490 proposed to prepare alternative tCEs by reacting the cellulose ether with cross-linkers having at least one aldehyde and at least one acid group, which both can react with the OH moiety of the cellulose ether. Glyoxylic acid is the preferred cross-linker and the only compound that is exemplified. However, glyoxylic acid is hazardous and difficult to handle. Furthermore, it was found that the use of glyoxylic acid adversely affects the tCEs. More specifically, the use of glyoxylic acid leads to an undesired reduction of the final viscosity after dissolution and hydrolysis of the tCE in the aqueous medium. It was further noted that substantial amounts of glyoxylic acid was needed in order to achieve a certain hydration time of the tCE, much higher than the amounts needed by the cross-linkers of the current invention. It is further noted that also WO 2012/140328 suggest the reaction of glyoxylic acid with natural polymers, particularly polysaccharides such as cellulose. Again the mechanism is said to be the reaction of the C=O carbonyl groups reacting with the OH groups of the polysaccharide to form hemiacetal bonds which is reversible upon hydrolysis in water. However in this reference solutions in solvents and the use of cationic compounds are needed, which is undesired.

Accordingly, there is a need for alternatives and improved products in this field. More particularly, an essentially glyoxal-free process is desired which does result in formation of truly reversible cross-linked of cellulose ethers. Also there is a need for a process which does not require a laborious modification of the polymer, which involves the use of benign chemicals, and which also overcomes problems observed when using conventional cross-linkers in the process of making the tCEs. Examples of such problems include: a low yield on cross-linking agent; poor distribution of cross-links over the polymer, typically resulting in inhomogeneities; and most importantly, formation of lower molecular weight decomposition products upon reversing the cross-links, typically the original cross-linking agent or a reaction product thereof, but sometimes also degradation products of the cellulose ether.

Surprisingly, we found that the use of specific cross-linking agents in the process to cross-link cellulose ethers solves all of the problems associated with the conventional processes. More specifically, the new cross-linkers were found to be a drop-in replacement for glyoxal, requiring only marginal changes of the existing process, the cross-links are temporary as for conventional products, but no decomposition products are formed upon reversing the cross-links. Also, in the process to form the cross-links a better control of the distribution of the cross-links was achieved and the yield on cross-linker was higher than the yield conventionally found for glyoxal. Also it was found that the use of salts, that are weak acids, or weak acids, in combination with the cross-linked products of the invention results in the same behavior as with glyoxal-cross-linked products. The products of the invention turned out to be particularly suitable for controlling the viscosity of aqueous systems by dissolving them into said aqueous system. In an embodiment the aqueous system to which the tCE is added is an aqueous paint or ink. In an embodiment the cTE is added to a paint or ink in a last step, after complete formulation of the paint, to bring the viscosity within specification. For this purpose it is important that the product dissolves lump-free, measured as a sufficiently high t1 value as defined below, while allowing high production speed, indicated by a low t2 value as defined below.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

The tCEs of the invention are characterized by having been cross-linked with one or more compounds selected from alkyl 2-hydroxy-2-alkoxyacetates of formula

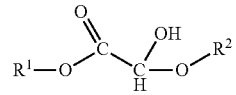

wherein each of $R^1$ and $R^2$ is independently a C1-4 alkyl group, hereinafter denoted as $(C_{1-4}$ alkyl$)$-OC(O)CHOHO—$(C_{1-4}$ alkyl$)$, and mixtures thereof. Preferred are MeOC(O)CHOHOMe, MeOC(O)CHOHOEt, EtOC(O)CHOHOMe, EtOC(O)CHOHOEt, and mixtures thereof, wherein Me is methyl and Et stands for the ethyl moiety, since they are easy to produce and since their low molecular weight reaction products, typically methanol and ethanol, are easily removed during the production of the tCE. The propyl (i- or n-) and butyl (i-, n-, or t-) analogues can be useful in systems wherein decomposition products like methanol and ethanol are not desired. Methyl 2-hydroxy-2-methoxyacetate is a suitable cross-linking agent. Hence, in one embodiment, the tCEs are cellulose ethers cross-linked with one or more products of the formula ($C_{1-4}$ alkyl)-OC(O)CHOHO—($C_{1-4}$ alkyl). In another embodiment the tCEs are cellulose ethers cross-linked with one or more products selected from the group of (m)ethyl 2-hydroxy-2-(m)ethoxyacetates. In another embodiment the tCEs are cellulose ethers cross-linked with methyl 2-hydroxy-2-methoxyacetate.

Although the inventors do not wish to be bound by the following theory, it is believed that the beneficial properties of the new tCEs is due to the fact that the cross-linkers form one reversible hemiacetal bond as well as one more permanent ester bond after reaction with the OH groups of the cellulose, and that these reactions can be easily controlled by varying the temperature during the crosslinking step. Expected cross-links are pictured below.

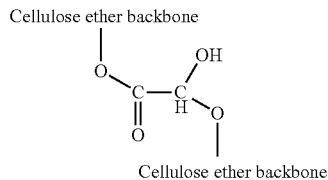

After dispersing the tCEs in an aqueous medium, and upon applying controlled conditions, particularly, pH, temperature, and polymer concentration, as conventional, the hemiacetal bonds are hydrolysed. However, under the typical and conventional hydrolysis conditions, the ester bonds remain intact, leading to less low molecular weight side-products like free glyoxal or products derivable from glyoxal, such as glyoxylic acid and glycolic acid. Therefore, in one embodiment, the invention relates to the use of one or more products of the formula ($C_{1-4}$ alkyl)-OC(O)CHOHO—($C_{1-4}$ alkyl) to cross-link cellulose ethers to form tCEs that after dispersion in aqueous medium and after reversing the cross-links, form cellulose ether solutions that are essentially free from low molecular weight decomposition products resulting from said cross-link reversal. The solutions are characterized in that they contain cellulose ethers bearing a (substituted) acetate moiety on the backbone chain. In another embodiment, the invention relates to a process wherein one or more products selected from the group of (m)ethyl 2-hydroxy-2-(m)ethoxyacetates are used to cross-link a cellulose ether. In another embodiment, methyl 2-hydroxy-2-methoxyacetates is used as a cross-linker for a cellulose ethers to form such a tCE.

Essentially free from low molecular weight decomposition products herein means that less than 80%, preferably less than 50%, more preferably less than 30%, even more preferably less than 20%, most preferably less than 10% of all ($C_{1-4}$ alkyl)-OC(O)CHOHO—($C_{1-4}$ alkyl), determined as glyoxylic acid hydrate, that was used to form the tCE is found to be detached from the cellulose ether when hydrolysed for 1 hour at a pH 8 and a temperature of 25° C. All percentages herein are expressed as percentages on a weight basis, unless denoted otherwise.

Another, not yet completely understood, phenomenon that was observed is that the tCEs formed in the claimed process wherein the ($C_{1-4}$ alkyl)-OC(O)CHOHO—($C_{1-4}$ alkyl) products were used as a cross-linker, showed a more homogeneous distribution of the cross-links than conventional tCE cross-linked for example with glyoxal, as demonstrated by less gel lumps being present during dispersion and hydrolysis of the tCE. Based on a non-binding theory, it is believed that the ($C_{1-4}$ alkyl)-OC(O)CHOHO—($C_{1-4}$ alkyl) products are more difficult to react with the OH groups on the cellulose ether than the conventional products, as is evidenced by the need for slightly higher reaction temperatures than used with conventional products like glyoxal. In practice, this results in a process wherein the cross-linker is considered to be more intimately mixed and more homogeneously distributed over the cellulose ether before it reacts. Therefore, in one embodiment, the invention relates to a process to make tCEs by first mixing a cellulose ether with one or more products of ($C_{1-4}$ alkyl)-OC(O)CHOHO—($C_{1-4}$ alkyl) at a temperature below 100° C., preferably below 80° C. to ensure a good distribution before reaction, suitably below 60° C. and more suitably below 35° C. and subsequent reaction of said cellulose ether and said ($C_{1-4}$ alkyl)-OC(O)CHOHO—($C_{1-4}$ alkyl) at a temperature above 30° C., suitably above 40° C., if desired, e.g. to shorten reaction times, above 50° C. In this process, the pH is preferably below 8.0, more preferably below 7.0, even more preferably below 6.5. To avoid unnecessary neutralization costs, the pH is suitably kept above 2.0, preferably above 4.0, suitably above 5.0.

In yet another embodiment, the invention relates to the use of the tCEs claimed, and as obtainable by the claimed process, in making lump free dissolutions by first dispersing a tCE in an aqueous medium at a temperature of less than 70° C., preferably less than 60° C., suitable less than 40° C., followed by hydrolysis of the hemiacetals bonds in a conventional way. Typically, the hemiacetals bonds are hydrolysed by controlling the pH of the aqueous medium at a value of 7.0 or more, suitably 8.0 or more, at a temperature of 100° C. or less to prevent boiling, more preferably less than 75° C. to conserve energy, suitably at a temperature below 50° C., or even below 35° C., for a period of at least 5 minutes. The higher the pH, the shorter the hydrolysis time can be. Similarly, the higher the temperature, the shorter the hydrolysis time can be.

Like for conventional glyoxal-cross-linked tCE, the tCE of the invention can be used in combination with a salt, whereby the salt preferably is coating the tCE. When dissolving such salt-tCE combinations of the invention, the salt can further influence the dissolution rate. According to a non-binding theory, this is due to the fact that the salt acts as a local pH buffer. More specifically, traditional salts used for this purpose are typically slightly acidic, leading to a pH<7 when dissolved in demi-water. Due to the decrease of the pH the speed of hydrolysis is reduced, allowing longer handling times. In another non-binding theory the salt coating takes time to dissolve before the aqueous medium can dissolve the tCE.

In an embodiment the solution that is obtained after hydrolysis comprises from 0.02 to 50.0% w/w of cellulose ether that is no longer cross-linked. Preferably the range is within 1 to 10% w/w. The lower limit is often used in systems wherein the cellulose ether has a high molecular weight. For cellulose ethers with a lower molecular weight, the more concentrated solutions are more feasible. The upper limit is typically dictated by the rheology of the resulting solution. In one embodiment the concentration is selected to be low enough so that no gel is formed. In another embodiment preferably a gel is formed.

For instance for making a concentrated solution for use in paint formulations, which is preferably gel-free, the concentration of the dissolved hydrolyzed tCE is suitably less than 3% w/w, more suitably less than 2% w/w. However, if the celluloses are to be dissolved at the concentration of the final paint formulation, then the amount is typically from 0.05 to 2% w/w.

The cellulose ethers that can be cross-linked in accordance with the invention can be selected from conventional water-soluble cellulose ethers and mixtures thereof. The cellulose ethers are suitably selected from nonionic cellulose ethers, such as from the group consisting of methylcellulose, ethylcellulose, hydroxyethylcellulose, hydrophobically modified hydroxyethylcellulose, hydroxypropylcellulose, hydrophobically modified hydroxypropylcellulose, hydroxyethylhydroxypropylcellulose, hydrophobically modified hydroxyethylhydroxypropylcellulose, methylhydroxyethylcellulose, hydrophobically modified methylhydroxyethylcellulose, methylhydroxypropylcellulose, hydrophobically modified methylhydroxypropyl-cellulose, methylhydroxyethylhydroxy-propylcellulose, hydrophobically modified methylhydroxyethylhydroxypropyl-cellulose, ethylhydroxyethylcellulose, and hydrophobically modified ethylhydroxy-ethylcellulose, methylethylhydroxyethylcellulose, and hydrophobically modified methylethylhydroxyethylcellulose; anionic cellulose ethers, such as from the group consisting of carboxymethylcellulose, carboxymethylmethylcellulose, hydrophobically modified carboxymethylcellulose, carboxymethylhydroxyethylcellulose, sulphoethylcellulose and carboxymethylsulphoethylcellulose; as well as cationic cellulose ethers, such as cationic hydroxyethylcellulose, cationic ethylhydroxyethylcellulose, cationic methylethylhydroxyethylcellulose, hydrophobically modified cationic ethylhydroxyethylcellulose, hydrophobically modified cationic methylethylhydroxyethylcellulose, and hydrophobically modified cationic hydroxylethylcellulose.

Suitably the cellulose ether is chosen from hydroxyethylcellulose, ethylhydroxyethylcellulose, methylhydroxyethylcellulose, methylethylhydroxyethylcellulose, methylhydroxypropylcellulose, hydrophobically modified hydroxyethylcellulose, hydrophobically modified methylhydroxyethylcellulose, hydrophobically modified ethylhydroxyethylcellulose, hydrophobically modified methylhydroxypropylcellulose, and hydrophobically modified methylethylhydroxyethylcellulose.

Also any mixture of any of the above-identified water-soluble cellulose ethers can be used.

The amount of cross-linking agent to be used to make the tCE, and consequently, the amount of cross-linking agent in the tCE, is suitably selected such that the desired dissolution behavior of the tCE is obtained. So when faster dissolution is required, the amount of cross-linking agent is reduced, and vice versa. Furthermore, in order to achieve the desired dissolution behavior it was observed that for a cellulose ether with a lower molecular weight more of the cross-linker is required than for the same type of cellulose ether with a higher molecular weight. Suitably the amount of crosslinking agent is selected such that per 100 parts by weight of cellulose ether, up to 20, preferably up to 10, more preferably up to 5, suitably up to 2.5 parts by weight of cross-linking agent is reacted. The amount of cross-linking agent is suitably selected such that per 100 parts by weight of CE, at least 0.01, preferably at least 0.2, more preferably at least 0.3 parts by weight of cross-linking agent is reacted. Usually the crosslinker is sprayed onto the cellulose ether before it is reacted. However, also other conventional techniques can be used to mix the (($C_{1-4}$ alkyl)-OC(O)CHOHO—($C_{1-4}$ alkyl) products with the cellulose ether. In order to increase the homogenous distribution over the cellulose ether, it may be desired to mix the compounds during and/or after the step wherein they are brought into contact. Such mixing can be performed using any conventional mixer, including horizontally stirred tanks.

Preferably the cross-linking step is run to essential completion for the reacting cross-linker, herein defined to be such that the tCE contains at least 85% w/w, preferably at least 90% w/w, more preferably at least 95% w/w, of the amount of cross-linker added. If the reaction, for instance for reasons of reactor economy, is not run to completion, meaning that part of the cross-linking agent remains unreacted in the product, the remainder is suitably flashed off, and/or otherwise removed from the tCE. Suitably such excess cross-linker is recycled to the cross-linking process. In such cases the amount of cross-linking agent to be used in the process is to be increased to compensate for the unreacted amount in order to still obtain a product with the desired level of cross-linking. If so desired, after crosslinking in a first reaction, the product can be further cross-linked by a second or further crosslinking reaction step, if so desired with the addition of further crosslinking agent.

In an embodiment, the amount of cross-linker used and reacted is such that the dissolution is slowed down such that at pH 7.0 the delay in solution, measured as t1 in the test method provided in the experimental section, is such that it is greater than 3 minutes (min), preferably more than 5 minutes, more preferably more than 10 minutes. In another embodiment, the full dissolution, measured as t2 in said test method, is such that it is within 3 hours, preferably within 120 minutes, more preferably within 80 minutes, most preferably within 50 minutes. In yet another embodiment both t1 and t2 are as defined in the two previous embodiments.

In an embodiment of the invention, a cellulose ether is mixed with the ($C_{1-4}$ alkyl)-OC(O)CHOHO—($C_{1-4}$ alkyl) product without that a solvent is used. Whereby a solvent is herein defined to be any organic compound with a molecular weight less than 500, excluding water, methanol, ethanol, propanol and butanol. In conventional processes with glyoxal, this cannot be done because the glyoxal then reacts too quickly with the CE, leading to an uneven distribution of the cross-linker over the tCE. Surprisingly, the use of ($C_{1-4}$ alkyl)-OC(O)CHOHO—($C_{1-4}$ alkyl) allows the mixing of the CE with the pure undiluted cross-linker and subsequent cross-linking while obtaining a homogeneous product even without that a solvent is used. This has advantages not only from a processing point of view (since solvent need not be removed), but it has the further benefit that the obtained tCEs are free from undesired solvent. The fact that the tCEs so obtained are essentially free from solvent is considered to be one of the reasons why the tCEs of the invention have improved storage stability when compared to products that do contain solvent. Essentially free from solvent herein means that the tCE contains less than 5% w/w, preferably less than 2% w/w, more preferably less than 1% w/w, and most preferably less than 0.5% w/w of solvent. Suitably it is does not contain any solvent. Hereby it is noted, that during the cross-linking reaction, depending on the cross-linker used, water and/or one or more lower alcohols is formed. The alcohols are preferably removed from the reaction mixture, suitably by flashing these products off, if so desired at a reduced pressure. If so desired, the removal of alcohol from the process can be used to drive the reaction with the cross-linker to completion.

It is noted that the present invention is not limited to products and process wherein just ($C_{1-4}$ alkyl)-OC(O)CHOHO—($C_{1-4}$ alkyl) products are used as cross-linking agent. The ($C_{1-4}$ alkyl)-OC(O)CHOHO—($C_{1-4}$ alkyl) products can be used in combination with one or more conventional cross-linking agent, for example to optimize costs. Suitable the ($C_{1-4}$alkyl)-OC(O)CHOHO—($C_{1-4}$ alkyl) products are combined with glyoxal, glyoxylic acid, glyoxylic esters and/or glyoxylic salts. In another embodiment the ($C_{1-4}$ alkyl)-OC(O)CHOHO—($C_{1-4}$ alkyl) products are used as the sole cross-linking agents. In another embodiment the ($C_{1-4}$ alkyl)-OC(O)CHOHO—($C_{1-4}$ alkyl) products are used together with glyoxal.

If combinations of ($C_{1-4}$ alkyl)-OC(O)CHOHO—($C_{1-4}$ alkyl) products and other cross-linking agents are used, then preferably the amount of the ($C_{1-4}$ alkyl)-OC(O)CHOHO—($C_{1-4}$ alkyl) is at least 40% w/w of all cross-linking agents, since such mixtures may be preferred from a commercial perspective, while still showing the advantages associated with the use of ($C_{1-4}$ alkyl)-OC(O)CHOHO—($C_{1-4}$ alkyl).

It is also noted that the hemiacetals of the formulae ($C_{1-4}$ alkyl)-OC(O)CHOHO—($C_{1-4}$ alkyl) may be hard to obtain commercially in the pure form. Hence blends with the corresponding acids (i.e. after hydrolysis of the ester group) may have to be used. Also the full acetal (($C_{1-4}$alkyl)OC(O)CO($C_{1-4}$ alkyl)O($C_{1-4}$ alkyl)) may be present in the hemiacetal or blend of hemiacetal and acid. Furthermore, if a combination with other cross-linking is considered, then suitably a blend of the one or more ($C_{1-4}$ alkyl)-OC(O)CHOHO—($C_{1-4}$ alkyl) with said other cross-linking agents is made and used. Such blends may comprise acids and acetals as well.

It is further noted that the tCEs of the invention, as is known in the art, can be combined with conventional weak acids, for instance to provide storage stability and to influence the dissolution rate. Preferably the weak acid is a solid to prevent lumping of the tCEs. Typical weak acids have a pKa of from 2.0 to 7.5, preferably from 4.0 to 6.0, and include polyacrylic acid (co)polymers, polymethacrylic acid (co)polymers, polymaleic acid (co)polymers, polyvinyl sulfonic acid (co)polymers, polyaspartic acid (co)polymers, phosphates, including alkali metal dihydrogen phosphates and di-alkyl monohydrogen phosphates, such as sodium potassium phosphate, pyrophosphates, bisulfates, amino acids, tartaric acid, adipic acid, isocitric acid, oxalic acid, malonic acid, maleic acid, itaconic acid, succinic acid, glutaric acid, gluconic acid, phthalic acid, and citric acid. Also mixtures of any of these acids can be used, such as mixtures of monosodium phosphate and citric acid.

If present, the acid is suitably used in an amount of from 0.01 percent by weight (% w/w) up to 5% w/w, preferably in an amount of 0.2-2% w/w, based on the weight of the tCE.

Throughout this document the term "pH" of a compound or solution, is the pH of a 2% by weight dispersion and/or solution of said compound in distilled water at a temperature of 25° C.

The present solutions have a great many applications in industry. Thus, a solution as explained above or obtained according to a method as detailed above, can be used for the production of fibers, for example by spinning, for the production of films, for surface coating, for thickening compositions, particularly for use in paints, or particular for use in personal care formulations, and for gluing.

In one embodiment, the tCEs are used for making the corresponding CE solutions to be used in making water-based paints.

EXPERIMENTAL

The cellulose ether (CE) used in these examples is Bermocoll® E511X (a non glyoxal treated cellulose ether available from AkzoNobel®).

Glyoxylic acid HC(O)C(O)OH was supplied as a 50% w/w aqueous solution by Alfa Aesar®.

MeOC(O)COHOMe was supplied by TCI Europe N.V., EtOC(O)COEtOEt by Acros®

Glyoxal 40% aqueous solution by Alfa Aesar.

Other chemicals were sourced from SigmaAldrich.

The process to evaluate the cross-linking of cellulose ethers to produce tCEs was performed using a Waring blender Model 8010. The cellulose ether was added to the blender. Thru a hole in the lid the cross-linking agent was added during 1 minute whilst mixing the cellulose ether material at room temperature. Thereafter the blender was activated for another minute. Subsequently, without blending, the blender with content was heated to the reaction temperature and kept at that temperature for the time specified, in order to study the crosslinking behavior (method A). Thereafter the product was cooled to room temperature.

In another test method, 20 g of the cellulose ether was slurried in 60-100 ml acetone at 25° C. after which the cross-linker is added. After evaporation of the acetone, in a fume hood, by a flow of pressurized air, the sample is treated in a OBH Nordica coffee mill 2393 at room temperature for 1 min. After such mixing of cross-linker and CE, the mixture is heated in an oven at different temperatures for various times to study the crosslinking behavior (method B).

The viscosity of solutions of cellulose ether or hydrolyzed tCE is determined using a 1% w/w solution and a Brookfield viscosimeter. 2.00 g of the (t)CE is added into a 250 ml glass beaker (diameter 6.5 cm). The sample is dispersed in about 50 ml boiling distilled or de-ionized water. The dispersion is swirled until lump-free. Then, 50 ml buffer solution at ambient temperature is added, followed by further addition of distilled or de-ionized water at room temperature until a concentration of 1% w/w is achieved. Dispersion of E511X and similar (M)EHEC products is efficient in hot water due to their inherent cloudpoint. However, this is not general for all cellulose ethers and other means to first disperse the material might be needed for certain other types of cellulose ethers. The beaker is mounted to a magnetic stirrer plate, a PTFE-coated magnetic stirrer bar of 6 mm diameter and 3 cm length is added, and a plastic lid is placed on top to avoid evaporation. The dispersion is then stirred for two hours at 60 rpm and placed in water bath for 1.5 hours at 20° C. before viscosity measurement. The viscosity measurement is performed on Brookfield Viscometer LV at 12 rpm using spindle 3. The value recorded after 2 min is the viscosity.

The dissolution behavior of a t(CE) is determined by analyzing the course of dissolving a cellulose derivative in a buffer solution by continuous viscometry. The time for reaching 10% of the final viscosity of the solution is called t1, whereas t2 is the time for reaching 95% of the final viscosity. The t1 value correlates to the time delay before dissolution starts and an abrupt viscosity increase is seen due to reversal of crosslinks. Hereto a viscometer of the type Rheomat RM 180, equipped with measuring system cup and anchor stirrer, referred to by the supplier as "Special relative System type 72", and of which the output is recorded, is used. The temperature of the measuring cup is controlled at 20° C. using a water bath with thermostat. 0.5 grams of (t)CE is added to the measuring cup of the viscometer, the rheometer is fitted, and the cup is place in the water bath. The stirring of the rheometer is started at 425 rpm. Then 50 ml of a buffer solution with a temperature of 20° C. is added and the recording of the viscosity is started. The process and data collection was controlled using RSI Orchestrator software. The pH of the buffer solution can vary as indicated in the examples. If no details are presented, the measurement took place using a solution buffered at pH 7.0 using "Phosphate buffer pH 7" ex Labservice AB. The viscosity is measured until a stable (final) viscosity is achieved. If the product dissolved with lump formation, then the test conditions are changed and the measuring cup of the rheometer is filled with 0.5 g of (t)CE and 5 g of acetone, before the buffer solution is added. The t1 value is the time (in minutes) until the starting viscosity increased with 10% of the total increase to the final viscosity. The t2 value is the time (in minutes) for the viscosity to reach 95% of the final viscosity.

Examples 1-3

Using method A, examples 1-3 were conducted with MeOC(O)COHOMe (MHMA) as the cross-linker and reaction conditions as indicated in Table 1. The results that were obtained are presented in the table.

TABLE 1

| Example | amount of MHMA (% w/w on CE) | reaction temp (° C.) | reaction time (min) | t1 (min) | t2 (min) | Viscosity (mPa · s) |
|---|---|---|---|---|---|---|
| 1 | 0.6 | 75 | 30 | 9.1 | 49.9 | |
| 2 | 0.6 | 100 | 40 | 19.8 | 81.9 | |
| 3 | 1.0 | 100 | 60 | 29.4 | 158 | |

All three products are tCEs according to the invention with varying degrees of crosslinking and an improved dissolution behavior.

The amount of reacted MeOC(O)COHOMe was found to be more than 30%.

More specifically, the amount of MeOC(O)COHOMe in the tCE was found to be at least 85% of the methoxy hydroxyl methyl acetate.

Examples 4-17

Using method B, examples 4-12 were conducted using MHMA as the cross-linker and reacting as indicated in Table 2. The results that were obtained are presented in the table. When the buffering was at pH 8, it was by means of a 0.5 M sodium phosphate buffer ex Alfa Aesar.

TABLE 2

| Example | amount of MHMA (% w/w on CE) | reaction temp (° C.) | reaction time (min) | t1 (min) | t2 (min) | Viscosity (mPa · s) |
|---|---|---|---|---|---|---|
| 4 | 0.1 | 80 | 30 | 11.7 | 36.1 | |
| 5 | 0.1 | 80 | 60 | 14.6 | 47.9 | |
| 6 | 0.2 | 100 | 65 | 15.6 | 49.2 | |
| 7 | 0.25 | 80 | 30 | 14.9 | 46.2 | |
| 8 | 0.25 | 80 | 60 | 18.4 | 52 | |
| 9a | 0.4 | 75 | 40 | 9.7 | 29.1 | |
| 9b | 0.4 | 75 | 40 | 8.5 | 25.2 | |
| 9c | 0.4 | 75 | 40 | 9.6 | 25.9 | |
| 10 | 0.5 | 100 | 60 | 24.7 | 75.4 | |
| 11 | 0.5 | 80 | 30 | 13.5 | 40.1 | |
| 12 | 0.5 | 80 | 120 | 23.2 | 70.4 | 7333 |
| 13 | 0.6 | 100 | 60 | 33.2 | 108.3 | |
| 14 | 1.0 | 25 | 120 | 15.8 | 45.3 | |
| 15 | 1.0 | 100 | 30 | 41.6 | 131.6 | |
| | | | | 7.3 (pH 8.0) | 28.5 (pH 8.0) | |
| 16 | 1.0 | 100 | 60 | 8.5 (pH 8.0) | 33.3 (pH 8.0) | 7300 |
| 17 | 1.0 | 100 | 120 | 9.2 (pH 8.0) | 37.7 (pH 8.0) | |

All products are tCEs according to the invention with varying degrees of crosslinking and good dissolution behavior. From the viscosity data it follows that the products are not degrading during the cross-linking step. The example wherein the reaction temperature was 25° C. showed cross-linking but the reaction was probably not complete.

Examples 18-21

Using method B, examples 18-12 were conducted using the MHMA cross-linked Bermocoll E511X of Example 8. The tCE was intimately mixed with salts to analyze the influence of the salts on the dissolution behavior. Dry mixing for 2 hours in a Turbulamixer using a plastic vessel and four porcelain marbles was found to be sufficient. In the test with mono sodium citrate, 8% by weight of the citrate was used, and for the mono sodium phosphate and citric acid, 1% by weight was used, all based on the amount of tCE. The buffer solutions at pH 7 and pH 8 were as mentioned above. The pH 8 weak buffer was a borax/HCl buffer ex Labservices. The results that were obtained are presented in table 3.

TABLE 3

| | | pH 8 | | pH 8 with weak buffer | | pH 7 | |
|---|---|---|---|---|---|---|---|
| Ex | Additive | t1 | t2 | t1 | t2 | t1 | t2 |
| 18 | None | 4.1 | 14 | 2.2 | 8.2 | 14 | 42 |
| 19 | Mono sodium citrate | 4.5 | 17 | 52 | 150 | 14.5 | 50 |
| 20 | Mono sodium phosphate | 4.1 | 14.5 | 3.1 | 9.7 | 13 | 42 |
| 21 | Citric acid | 3.4 | 13.5 | 4.4 | 15.1 | 12.5 | 45 |

These results show that, particularly in weakly buffered aqueous systems, acidic salts and weak acids can be used to retard the dissolution rate.

Comparative Examples A-B

In these examples the Bermocoll® E511X was not cross-linked but used "as is" and evaluated in accordance with method A. The reaction conditions and results are presented in Table 4.

TABLE 4

| Example | amount of MHMA (% w/w on CE) | reaction temp (° C.) | reaction time (min) | t1 (min) | t2 (min) | Viscosity (mPa · s) |
|---|---|---|---|---|---|---|
| A | 0 | 0 | 0 | 0.3 | 6.0 | 6200 |
| B | 0 | 100 | 120 | | | 6350 |

These results show that the cellulose ether itself is stable, also when heated, but the dissolution time is too short, resulting in an undesired dissolution behavior (gel formation was observed).

Comparative Examples C-F

In these examples the Bermocoll® E511X was cross-linked using glyoxylic acid (GA) using method A. The reaction conditions and results are presented in Table 5.

TABLE 5

| Example | amount of GA (% w/w on CE) | reaction temp (° C.) | reaction time (min) | t1 (min) | t2 (min) | Viscosity (mPa · s) |
|---|---|---|---|---|---|---|
| C | 1.0 | 100 | 30 | 1.7 | 20.2 | 4850 |
| D | 1.0 | 100 | 60 | 4.3 | 22.3 | |
| E | 1.0 | 100 | 120 | 6.4 | 83.2 | 2420 |
| F | 1.0 | 100 | 180 | 8.2 | 117.5 | 650 |

These results show that reaction of CE with glyoxylic acid leads to cross-linking, which is seen by the longer t1 and t2 times. However, after reversing the cross-links, the cellulose ether showed a too low viscosity due to undesired degradation and also some insolubles were noted. In comparison with MHMA higher amounts of glyoxylic acid and more extensive heating is needed to reach the desired t1.

Comparative Examples G-K

In these the performance of glyoxylic acid (GA) in method B was evaluated. The reaction conditions and results are presented in Table 6.

TABLE 6

| Example | amount of GA (% w/w on CE) | reaction temp (° C.) | reaction time (min) | t1 (min) | t2 (min) | Viscosity (mPa · s) |
|---|---|---|---|---|---|---|
| G | 0.5 | 100 | 120 | 7.2 | 50.3 | 6530 |
| H | 0.5 | 100 | 210 | 12.0 | 111.0 | 4350 |
| I | 1.0 | 100 | 120 | 10.2 | 85.4 | 450 |
| J | 1.0 | 100 | 40 | 8.2 | 26.9 | 6850 |
| K | 0.5 | 100 | 60 | 4.2 | 15.8 | 6550 |

These results show that the reaction with glyoxylic acid is difficult to control. An efficient use of the glyoxylic acid, requiring the longer reaction time, results in degradation of the cellulose ether.

Comparative Examples L-N

In these examples the Bermocoll® E511X was cross-linked using glyoxal (GL) using method A. The reaction conditions and results are presented in Table 7.

TABLE 7

| Example | amount of GL (% w/w on CE) | reaction temp (° C.) | reaction time (min) | t1 (min) | t2 (min) | Yield glyoxal reaction (%) |
|---|---|---|---|---|---|---|
| L | 0.5 | 80 | 10 | 24.4 | 87.8 | 45 |
| M1 | 0.3 | 60 | 10 | 17.3 | 71.7 | 52 |
| M2 | 0.3 | 60 | 10 | 20.3 | 71.8 | 62 |
| N | 0.1 | 80 | 10 | 12.2 | 45.8 | 50 |

These results show that reaction of CE with glyoxal leads to products with a desired dissolution behavior. However, the amount of glyoxal that was bound to the tCE was found to be undesired low, resulting in contamination of end product, high amounts of volatiles in the process, and an inefficient process with associated costs. The reaction yield glyoxal reaction is expressed as the percentage of glyoxal used and calculated as % w/w bound glyoxal/% w/w total added amount of glyoxal*100%. The amount of bound glyoxal was determined as described in the Cefic brochure of September 2002 marked "depot legale D/3158/2002/9".

Comparative Examples O-Y

In these the performance of glyoxal (GL) in method B was evaluated. The reaction conditions and results are presented in Table 8.

TABLE 8

| Example | amount of GL (% w/w on CE) | reaction temp (° C.) | reaction time (min) | t1 (min) | t2 (min) | Yield glyoxal reaction (%) |
|---|---|---|---|---|---|---|
| O | 0.05 | 40 | 10 | 8.3 | 35.0 | 57 |
| P | 0.05 | 100 | 10 | 9.8 | 36.6 | 50 |
| Q | 0.05 | 40 | 120 | 9.5 | 34.4 | 63 |
| R | 0.05 | 100 | 120 | 8.1 | 35.3 | 45 |
| S | 0.275 | 70 | 65 | 20.6 | 59.4 | 45 |
| T | 0.275 | 70 | 65 | 20.9 | 57.5 | 38 |
| U | 0.275 | 70 | 65 | 21.8 | 58.8 | 35 |
| V | 0.5 | 40 | 10 | 27.2 | 71.1 | 32 |
| W | 0.5 | 100 | 10 | 27.8 | 72.1 | 45 |
| X | 0.5 | 40 | 120 | 27.4 | 69.5 | 34 |
| Y | 0.5 | 100 | 120 | 29.2 | 100.3 | 39 |

These results again show that the amount of glyoxal that was bound to the tCE was found to be undesired low, resulting in contamination of end product, high amounts of volatiles in the process, and an inefficient process with associated costs.

Comparative Example Z

In this example the performance of ethyldiethoxyacetate EtOC(O)COEtOEt was evaluated using method A. Reaction took place at 80° C. for 2 hours. The resulting tCE showed undesired dissolution behavior and gel formation did not allow the determination of t1 and t2. Also when additionally 1% w/w of acetic acid was present during the cross-linking (comparative example Z2), the product gelled in the test.

Comparative Example AA-AB

Examples 18 and 19 were repeated using a commercial glyoxal-cross-linked tCE ex Ashland, i.e. Natrosol 250 HBR. The result is presented below.

| Ex | Additive | pH 8 t1 | pH 8 t2 | pH 8 with weak buffer t1 | pH 8 with weak buffer t2 | pH 7 t1 | pH 7 t2 |
|----|----------|----|----|----|----|----|----|
| AA | None | 4.6 | 28 | 9.1 | 44 | 28 | 61 |
| AB | Mono sodium citrate | 5.2 | 35 | Dnd* | Dnd* | 38 | 88 |

*= Dnd means that the sample did not dissolve fast enough

These examples show that the influence of salts is comparable. However, after dissolution the solutions of these comparative examples will contain glyoxal-derived hydrolysis products in the aqueous phase. Furthermore, in comparison with examples 18-19 it is shown that complete dissolution times are longer for the conventional product of comparative examples AA-AB.

The invention claimed is:

1. Temporary cross-linked cellulose ether characterized by being a cellulose ether cross-linked with one or more cross-linking agents selected from the group of compounds with formula (C1-4 alkyl)-OC(O)CHOHO—(C1-4 alkyl).

2. Temporary cross-linked cellulose ether of claim 1 characterized in that the one or more cross-linking agents are selected from the group of compounds of formulae MeOC(O)CHOHOMe, MeOC(O)CHOHOEt, EtOC(O)CHOHOMe, and EtOC(O)CHOHOEt.

3. Temporary cross-linked cellulose ether of claim 1 comprising 0.01 to 10 parts by weight the cross-linking agent per 100 parts by weight of cellulose ether.

4. Temporary cross-linked cellulose ether of claim 1 which further comprises cross-links of glyoxal.

5. Process to make a temporary cross-linked cellulose ether of claim 1, wherein in a first step the cellulose ether is contacted with one or more cross-linking agents selected from the group of compounds with formula (C1-4 alkyl)-OC(O)CHOHO—(C1-4 alkyl) and in a second step said cellulose ether is reacted with said cross-linking agents.

6. Process according to claim 5 wherein the second step is performed at a temperature of 30° C. or more.

7. Process according to claim 5 wherein alcohol or alcohols that are formed during the cross-linking reaction step are being removed from the reaction mixture.

8. The process of claim 5 wherein the second step is performed at a temperature of 40° C. or more.

9. The process of claim 5 wherein the second step is performed at a temperature of 50° C. or more.

10. Process to make an aqueous solution of a cellulose ether, comprising a first step of preparing a temporary cross-linked material according to claim 1, a step wherein the temporary cross-linked material is added to an aqueous medium, and a later step wherein the temporary cross-linked material is hydrolysed.

11. Process of claim 10 wherein the aqueous medium is an aqueous paint or glue formulation.

12. Process to make a solution of a cellulose ether by first dispersing a temporary cross-linked cellulose ether of claim 1 in an aqueous medium followed by the step of hydrolyzing the temporary cross-linked cellulose ether.

13. Process of claim 12 wherein the pH of the aqueous medium during the hydrolysis step is 7.0 or greater.

14. Process of claim 13 wherein the aqueous medium is an aqueous paint or glue formulation.

15. Process of claim 12 wherein the aqueous medium is an aqueous paint or glue formulation.

\* \* \* \* \*